US009990069B2

(12) United States Patent  
Yao et al.

(10) Patent No.: US 9,990,069 B2  
(45) Date of Patent: Jun. 5, 2018

(54) ELECTROMAGNETISM AND CAPACITANCE INTEGRATED TOUCH SCREEN, TOUCH DISPLAY PANEL AND TOUCH DISPLAY APPARATUS

(71) Applicants: Shanghai Tianma Micro-Electronics Co., Ltd., Shanghai (CN); Tianma Micro-Electronics Co., Ltd., Shenzhen (CN)

(72) Inventors: Qijun Yao, Shanghai (CN); Feng Lu, Shanghai (CN); Xianxiang Zhang, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 63 days.

(21) Appl. No.: 14/952,749

(22) Filed: Nov. 25, 2015

(65) Prior Publication Data

US 2016/0154511 A1 Jun. 2, 2016

(30) Foreign Application Priority Data

Nov. 28, 2014 (CN) .......................... 2014 1 0709186

(51) Int. Cl.
*G06F 3/045* (2006.01)
*G06F 3/041* (2006.01)
(Continued)

(52) U.S. Cl.
CPC ............ *G06F 3/0412* (2013.01); *G06F 3/044* (2013.01); *G06F 3/046* (2013.01); *G06F 3/0416* (2013.01); *G06F 2203/04106* (2013.01)

(58) Field of Classification Search
CPC ......... G06F 3/044; G06F 3/046; G06F 3/0412
(Continued)

(56) References Cited

U.S. PATENT DOCUMENTS 8,587,536 B2 11/2013 Yeh et al.  
2012/0306810 A1* 12/2012 Lee .......................... G06F 3/046  
345/174

(Continued)

FOREIGN PATENT DOCUMENTS

CN 101526679 B * 11/2010 ............... G09G 3/36  
CN 103294294 A 9/2013  
(Continued)

OTHER PUBLICATIONS

Chinese Application No. 201410709186.8, First Office Action dated Mar. 20, 2017.

*Primary Examiner* — Yuzhen Shen  
(74) *Attorney, Agent, or Firm* — Alston & Bird LLP

(57) ABSTRACT

An electromagnetism and capacitance integrated touch screen, a touch display panel and a touch display apparatus are provided. Multiple virtual electrodes (generally located between a drive electrode and a detection electrode) in a capacitance touch structure are arranged to be coil-shaped, and the coil-shaped virtual electrode functions as a coil of an electromagnetism touch structure. In this way, the electromagnetism touch structure can be implemented without adding extra structure and process to the capacitance touch structure, thereby achieving compatibility between the electromagnetism touch structure and the capacitance touch structure.

9 Claims, 7 Drawing Sheets

(51) Int. Cl.
    *G06F 3/044*      (2006.01)
    *G06F 3/046*      (2006.01)

(58) Field of Classification Search
    USPC .......................................................... 345/174
    See application file for complete search history.

(56) References Cited

U.S. PATENT DOCUMENTS

| | | | |
|---|---|---|---|
| 2014/0002413 A1* | 1/2014 | Kim | G06F 3/0416 |
| | | | 345/174 |
| 2015/0022488 A1 | 1/2015 | Xi et al. | |
| 2015/0355758 A1* | 12/2015 | Zhang | G06F 3/046 |
| | | | 345/174 |
| 2016/0117026 A1* | 4/2016 | Ahn | G06F 3/046 |
| | | | 345/174 |
| 2016/0139701 A1 | 5/2016 | Wang | |
| 2016/0179266 A1 | 6/2016 | Yang | |
| 2017/0024042 A1* | 1/2017 | Oem | G06F 3/044 |

FOREIGN PATENT DOCUMENTS

| | | |
|---|---|---|
| CN | 103914172 A | 7/2014 |
| CN | 103941946 A | 7/2014 |
| CN | 104049814 A | 9/2014 |
| CN | 104142763 A | 11/2014 |
| EP | 2735948 A1 | 5/2014 |

\* cited by examiner

ELECTROMAGNETISM AND CAPACITANCE INTEGRATED TOUCH SCREEN, TOUCH DISPLAY PANEL AND TOUCH DISPLAY APPARATUS

CROSS REFERENCE TO RELATED APPLICATIONS

The present application claims the priority to Chinese Patent Application No. 201410709186.8, entitled "ELECTROMAGNETISM AND CAPACITANCE INTEGRATED TOUCH SCREEN, TOUCH DISPLAY PANEL AND TOUCH DISPLAY APPARATUS", filed on Nov. 28, 2014 with the State Intellectual Property Office of People's Republic of China, which is incorporated herein by reference in its entirety for all purposes.

FIELD

This disclosure relates to the field of touch, and in particular to an electromagnetism and capacitance integrated touch screen, a touch display panel including the electromagnetism and capacitance integrated touch screen, and a touch display apparatus including the touch display panel.

BACKGROUND

In recent years, displays with touch functionality have become more and more popular due to convenience. Based on different working principles, the touch screen has multiple types, for example a resistive-type touch screen, a capacitive-type touch screen and an electromagnetic-type touch screen. It is convenient for a user to operate the capacitive-type touch screen directly by a hand. However, in the case that a user writes with an electromagnetic pen on the touch screen, it is difficult to distinguish the touch from the hand and the touch from the electromagnetic pen, since the hand is generally placed on the touch screen. In the case that the hand is placed on the electromagnetic-type touch screen, a position of the electromagnetic pen can be determined accurately.

A touch screen integrated with the electromagnetism touch function and capacitance touch function is generally referred to as an electromagnetism and capacitance integrated touch screen, which includes advantages of the electromagnetism touch and the capacitance touch each and is increasingly desired by people. However, the technical problem with conventional technology is how to make an electromagnetism touch structure compatible with a capacitance touch structure.

BRIEF DESCRIPTION OF THE INVENTION

The technical problem to be solved by the embodiments of the disclosure is: how to make an electromagnetism touch structure compatible with a capacitance touch structure.

In order to solve the above technical problem, according to the embodiments of the disclosure, provided is an electromagnetism and capacitance integrated touch screen, which includes: multiple capacitive touch electrodes and multiple coil-shaped electrodes; where the coil-shaped electrode are virtual electrodes when a capacitive touch detection is performed; and the coil-shaped electrodes are configured to detect an electromagnetic touch during an electromagnetic touch detection.

A touch display panel is provided according to the embodiments of the disclosure, which includes the electromagnetism and capacitance integrated touch screen described above.

A touch display apparatus is provided according to the embodiments of the disclosure, which includes the touch display panel described above.

In the electromagnetism and capacitance integrated touch screen, the touch display panel and the touch display apparatus provided according to the embodiments of the disclosure, multiple virtual electrodes (generally located between a drive electrode and a detection electrode) in the capacitance touch structure are arranged to be coil-shaped, and the coil-shaped virtual electrode functions as a coil of the electromagnetism touch structure. As compared with the conventional technology, the electromagnetism touch structure can be implemented without adding extra structure and process to the capacitance touch structure, thereby achieving compatibility between the electromagnetism touch structure and the capacitance touch structure.

DETAILED DESCRIPTION

According to the present disclosure, multiple virtual electrodes (generally located between a drive electrode and a detection electrode) in a capacitance touch structure are arranged to be coil-shaped, and the coil-shaped virtual electrode functions as a coil of an electromagnetism touch structure. In this way, the electromagnetism touch structure can be implemented without adding extra structure and process to the capacitance touch structure, thereby achieving compatibility between the electromagnetism touch structure and the capacitance touch structure. That is to say, according to an aspect of the present disclosure, it is provided an electromagnetism and capacitance integrated touch screen, which includes: multiple capacitive touch electrodes (generally including multiple capacitance drive electrodes and multiple capacitance induction electrodes) and multiple coil-shaped electrodes; where the coil-shaped electrode functions as a virtual electrode for a capacitive touch detection, in the case that the capacitive touch detection is performed; and the coil-shaped electrode functions as an sensing coil for an electromagnetic touch during the electromagnetic touch detection.

The capacitance touch structure may be implemented by many different ways, and the electromagnetism touch structure may be also implemented by many different ways. Accordingly, the coil-shaped electrode may be wired and compatible with capacitance touch structures in different embodiments by many different ways. Hereinafter some specific embodiments are described.

First Embodiment

Figure 1:
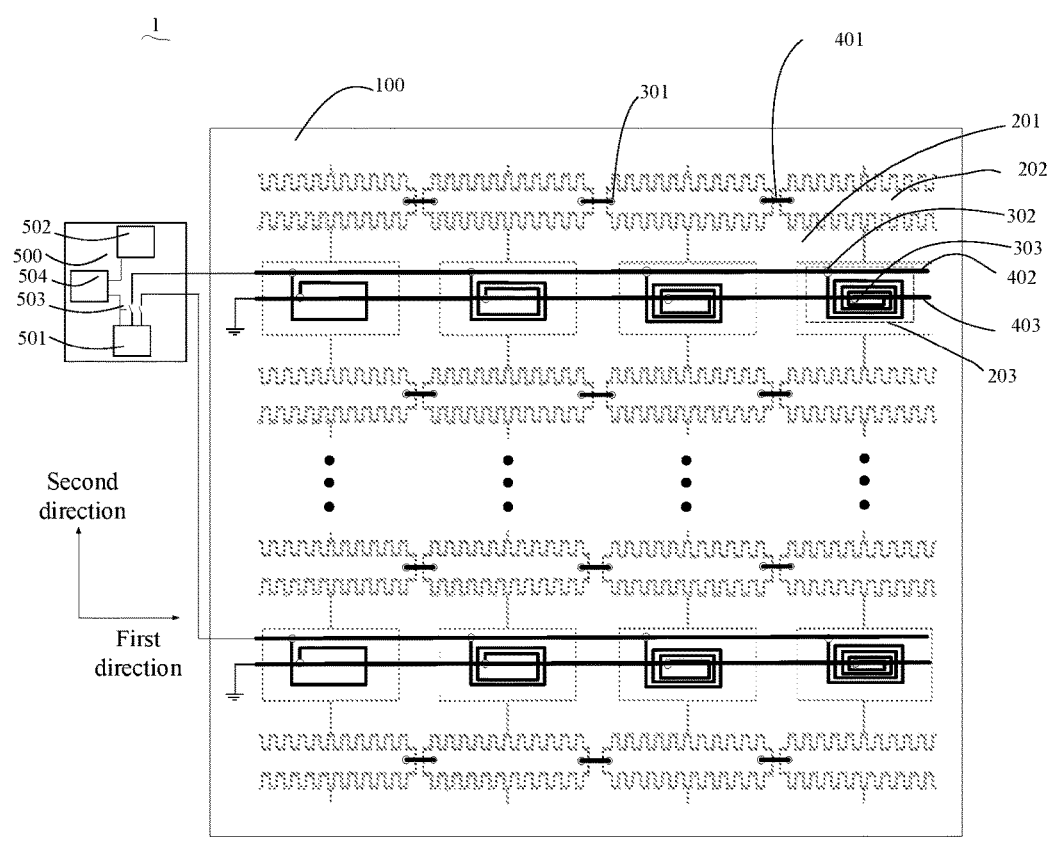
FIG. 1 is a top view of a structure of an electromagnetism and capacitance integrated touch screen according to a first embodiment of the disclosure.

FIG. 1 is a schematic top view of a structure of an electromagnetism and capacitance integrated touch screen 1 according to an embodiment of the disclosure. Referring to FIG. 1, the electromagnetism and capacitance integrated touch screen 1 includes a substrate 100 and a touch structure layer located on the substrate 100. The touch structure layer includes multiple first electrodes 201, and multiple second electrodes 202 and multiple coil-shaped electrodes 203. The coil-shaped electrode 203 functions as a virtual electrode for a capacitive touch detection during the period capacitive touch detection is performed; and the coil-shaped electrode 203 functions as an induction coil for an electromagnetic touch detection, during the electromagnetic touch detection is performed.

Specifically, as shown in FIG. 1, the first electrodes 201 extending along a first direction and the second electrodes 202 extending along a second direction. The second electrodes 202 are insulated from and intersect the first electrodes 201. In one embodiment, the first direction is perpendicular to the second direction. Each coil-shaped electrode 203 may be located at an intersection area of the first electrode 201 and the second electrode 202, or located in a region surrounded by two adjacent first electrodes 201 and two adjacent second electrodes 202. The first electrode 201 may be a capacitance driving electrode, and accordingly the second electrode 202 may be a capacitance sensing electrode. The first electrode 201 may be also a capacitance sensing electrode, and accordingly the second electrode 202 may be a capacitance driving electrode.

Figure 2:
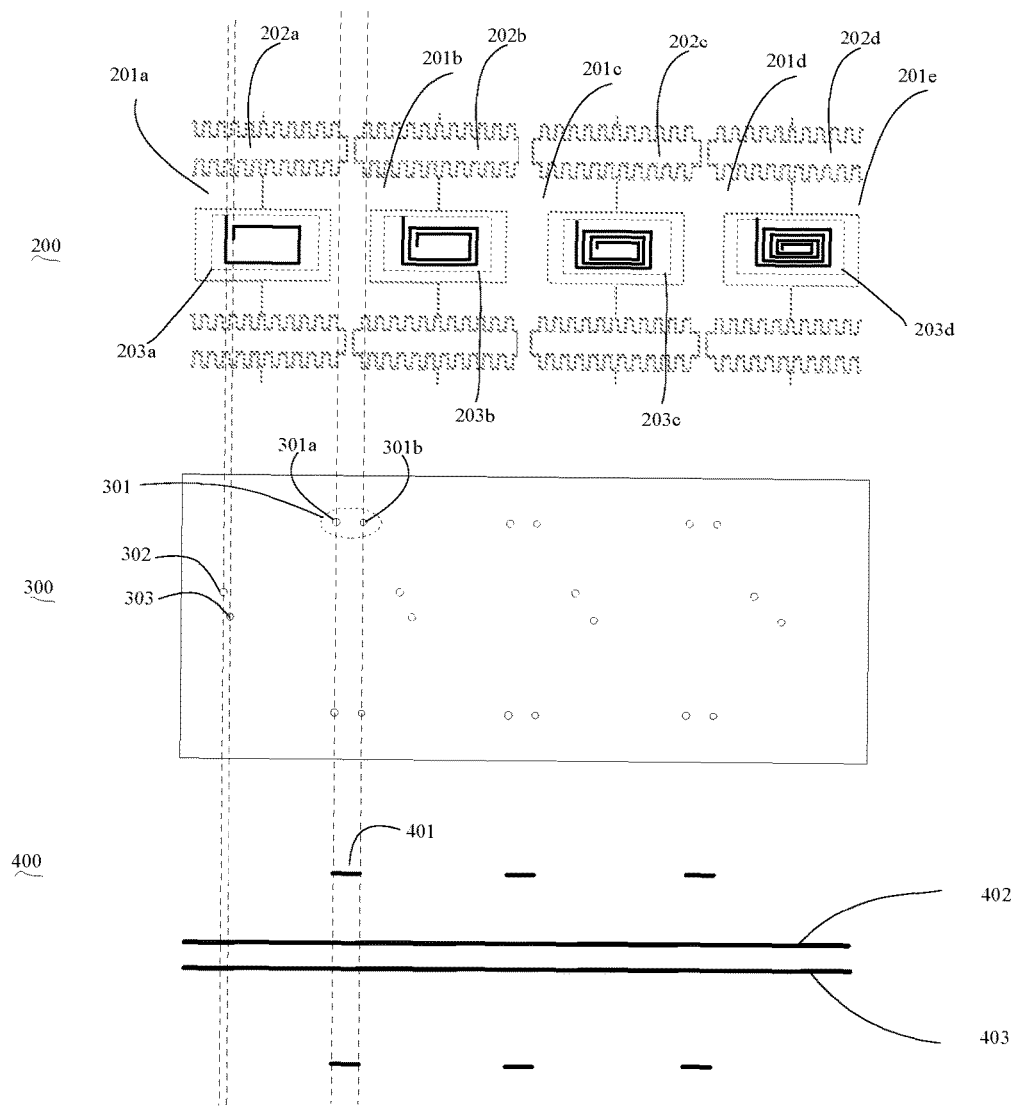
FIG. 2 is a diagram of a correspondence of patterns of various layers in the touch structure layer of FIG. 1.

FIG. 2 is a diagram of a correspondence of patterns of various layers in the touch structure layer of FIG. 1. In conjunction with FIG. 1 and FIG. 2, from a perspective of the layer structure, the touch structure layer includes a first electrode layer 200, a second electrode layer 400 and an insulation layer 300 located between the first electrode layer and the second electrode layer 400. The first electrode layer 200, the second electrode layer 400 and the insulation layer 300 are located on the substrate 100. The first electrode 201, the second electrode 202 and the coil-shaped electrode 203 are located in the first electrode layer 200. The first electrode 201 is insulated from and intersects the second electrode 202, thus, each of the second electrodes 202 is divided into multiple segments by the first electrodes 201. In FIG. 2, there are five first electrodes 201, respectively labeled as 201a, 201b, 201c, 201d and 201e; and four coil-shaped electrodes 203, respectively labeled as 203a, 203b, 203c and 203d. Each of the second electrodes 202 is divided into four segments, respectively labeled as 202a, 202b, 202c and 202d, by five first electrodes 201a, 201b, 201c, 201d and 201e. The four coil-shaped electrodes 203a, 203b, 203c and 203d may be located in a grid-shaped region surrounded by the five first electrodes 201 and two adjacent second electrodes 202. The coil-shaped electrode 203 functions may be virtual electrodes while the capacitive touch detection is performed. The coil-shaped electrode 203 is configured to detect an electromagnetic touch while the electromagnetic touch detection is performed, which will be described in greater detail below.

As shown in FIG. 2, the second electrode layer 400 includes multiple bridge electrodes 401. The insulation layer 300 includes multiple first via holes 301. The segments 202a, 202b, 202c and 202d of the second electrode 202 are electrically connected to each other through the bridge electrode 401 and the first via hole 301. Specifically, the segments 202a, 202b, 202c and 202d of the second electrode 202 must be electrically connected to each other, and FIG. 2 shows an embodiment for electrically connecting. Taking the segment 202a and the second segment 202b for an example, a first sub-via hole 301a is located at a side where the segment 202a is located, and a second sub-via hole 301b is located at a side where the segment 202b is located. Viewed from top, the bridge electrode 401 is located between the segment 202a and the segment 202b, and is also located between the first sub-via hole 301a and the second sub-via hole 301b. In this way, the segment 202a is electrically connected to the segment 202b through the bridge electrode 401, the first sub-via hole 301a, and the second sub-via hole 301b. The other segments 202c and 202d are connected similarly.

Figure 3A:
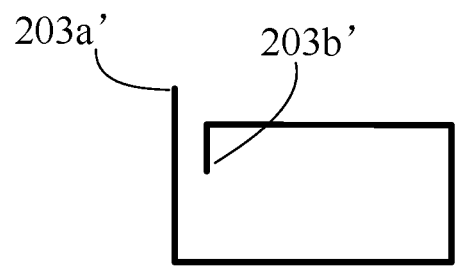
FIG. 3a is a schematic diagram of a coil-shaped electrode in FIG. 2 being amplified.
Figure 3B:
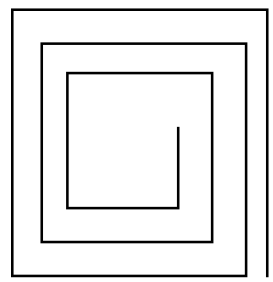
FIG. 3b is a schematic diagram of another shape of the coil-shaped electrode.
Figure 3C:
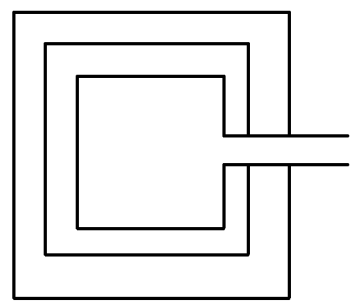
FIG. 3c is a schematic diagram of another shape of the coil-shaped electrode.
Figure 3D:
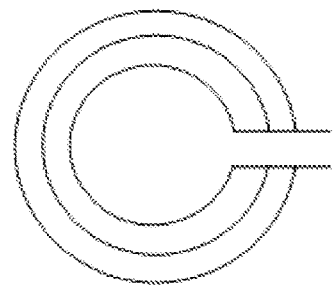
FIG. 3d is a schematic diagram of another shape of the coil-shaped electrode.

In addition, FIG. 3a shows a schematic diagram of the coil-shaped electrode 203 of FIG. 2 being amplified. In conjunction with FIG. 2 and FIG. 3, the second electrode layer 400 further includes multiple detection lines 402 and multiple ground lines 403. Each coil-shaped electrode 203 includes a first terminal 203a' and a second terminal 203b'. The first terminal 203a' is electrically connected to the detection line 402. The second terminal 203b' is electrically connected to the ground line 403. Specifically, the insulation layer 300 further includes multiple second via holes 302 and third via holes 303. The first terminal 203a' is electrically connected to the detection line 402 through the second via hole 302. The second terminal 203b' is electrically connected to the ground line 403 through the third via hole 303. The detection line 402 is configured to transmit an induction signal (for example an induction voltage) generated by inducing an external electromagnetic signal (for example an electromagnetic pen) by the coil-shaped electrode 203 to an external electromagnetic touch detection circuit, during the electromagnetic touch detection is performed. The coil-shaped electrode 203 may have other shapes as shown in FIG. 3b, FIG. 3c and FIG. 3d, beyond the shape shown in FIG. 3a.

Different structures and connection to an external drive detection circuit via different wirings may be adopted for various coil-shaped electrode 203. Several feasible ways are described in conjunction the drawings hereinafter.

FIG. 1 shows an electromagnetism and capacitance integrated touch screen, where the coil-shaped electrodes 203 form an array with M rows and N columns M and N are positive integers. The coil-shaped electrodes 203 in the same row are electrically connected to the same detection line. All the coil-shaped electrodes 203 in the same row may have different numbers of turns or different areas (i.e., different numbers of turns, different arrears, or different numbers of turns and different areas), or the same number of turns or the same area. All the coil-shaped electrodes 203 in the same column may have the same number of turns or the same area, or may also have different numbers of turns or different areas. In one embodiment, all the coil-shaped electrodes 203 in the same column have the same number of turns and the same area; however, all the coil-shaped electrodes 203 in the same row have the different number of turns or the same area. Since all the coil-shaped electrodes 203 in the same row have different numbers of turns and/or different areas, even if all the coil-shaped electrodes 203 in the same row are electrically connected to the same detection line, induction signals generated by inducing by all the coil-shaped electrodes 203 in the same row may have different intensities. Thus, a coordinate of a touch position corresponding to the same row can be also detected.

In another embodiment, all the coil-shaped electrodes 203 in the same column may have different numbers of turns and/or different areas (i.e., different numbers of turns, different areas, or different numbers of turns and different areas). It should be noted that, here the "row" may be parallel with a first direction, and accordingly the "column" is parallel with a second direction; alternatively, the "row" may be parallel with the second direction, and accordingly the "column" is parallel with the first direction. In other embodiments, all the coil-shaped electrodes 203 in the same column are electrically connected to the same detection line; all the coil-shaped electrodes 203 in the same column have different numbers of turns and/or different areas (i.e., different numbers of turns, different areas, or different numbers of turns and different areas); and all the coil-shaped electrodes 203 in the same row may have the same number of turns and/or the same area, or may also have different numbers of turns and/or different areas. As shown in FIG. 1, the array formed by the coil-shaped electrodes 203 has M rows, accordingly M detection lines 402 are provided, and the external electromagnetic touch detection circuit (generally, an IC chip) is electrically connected to the M detection lines 402 via only M corresponding ports, thereby significantly reducing the number of ports of the external drive detection circuit.

Hereinafter a working process of the electromagnetism and capacitance integrated touch screen provided according to an embodiment of the disclosure is described in conjunction with FIG. 1. As shown in FIG. 1, the electromagnetism and capacitance integrated touch screen further includes an electromagnetic touch detection circuit 501 connected to the detection circuit 402. While an electromagnetic touch detection is performed, an external electromagnetic pen (not shown) emits an electromagnetic signal, each row of coil-shaped electrodes 203 generate an induction signal (for example an induction current or an induction voltage) by inducing the electromagnetic signal emitted from the electromagnetic pen; and the induction signal can be detected by the electromagnetic touch detection circuit 501 through the detection line 402. The electromagnetic touch detection circuit 501 determines coordinates of a touch position of the electromagnetic pen based on the induction signal detected on the detection line 402. In addition, the electromagnetism pen may be active or passive.

The electromagnetism and capacitance integrated touch screen may further include a capacitance touch drive detection circuit 502 electrically connected to the first electrode 201 and the second electrode 202 (a connection line for connecting the capacitance touch drive detection circuit 502 to the first electrode 201 and the second electrode 202 is not shown in the Figure). When a capacitive touch detection is performed, the capacitance touch drive detection circuit applies a capacitance driving signal to the first electrode 201 row by row, detects a capacitance sensing signal from each second electrode 202, and determines coordinates of a position of a touch object (for example, a finger) based on the detected capacitance sensing signal.

According to the electromagnetism and capacitance integrated touch screen shown in FIG. 1 and FIG. 2, the capacitive touch detection and the electromagnetic touch detection are generally performed in a time-division manner. A switch unit 503 (which may be a field effect transistor or a triode) is provided between the electromagnetic touch detection circuit 501 and the detection line 402 in FIG. 1. The electromagnetism and capacitance integrated touch screen further includes a mode switching unit 504 electrically connected to the magnetism touch detection circuit 501, the capacitance touch drive detection circuit 502 and the switch unit 503 each. During a capacitive touch detection, the mode switching unit 504 controls the capacitance touch drive detection circuit 502 to start to work and turn off the switch unit 503 simultaneously. In this case, the capacitance touch drive detection circuit 502 applies a capacitance driving signal to the first electrode 201 row by row, and detects a capacitance sensing signal from each second electrode 202. At this time, all the coil-shaped electrodes 203 are electrically connected to ground, function as virtual electrodes. The existing of the virtual electrode reduces areas of the first electrode 201 and the second electrode 202 and a self-capacitance of the first electrode 201 and the second electrode 202 each. Thus, a touch sensitivity of the electromagnetism and capacitance integrated touch screen can be improved. Furthermore, the existing of the virtual electrode enables the first electrode 201 and the second electrode 202 not to be easily visible. Thereby the whole structure of the electromagnetism and capacitance integrated touch screen can be uniformly distributed, and a better visual effect of the electromagnetism and capacitance integrated touch screen can be obtained. In this case, the electromagnetism and capacitance integrated touch screen works in a capacitive touch detection working mode, and accordingly the first electrode 201, the second electrode 202 and the coil-shaped electrode 203 functioning as the virtual electrode form a capacitance touch structure.

In addition, during an electromagnetic touch detection, the mode switching unit 504 controls the electromagnetic touch detection circuit 501 to start to work and turn on the switch unit 503 simultaneously. In this case, all the coil-shaped electrodes 203 function as induction coils, generate an induction signal by inducing an external electromagnetic signal (for example an electromagnetic signal emitted from an electromagnetic pen); and the electromagnetic touch detection circuit 501 detects the induction signal through each detection line 402. In this case, the electromagnetism and capacitance integrated touch screen works in an electromagnetic touch detection working mode, and accordingly the coil-shaped electrode 203 functioning as the electromagnetic induction coil and the detection line 402 form an electromagnetism touch structure. In addition, as shown in FIG. 1, the electromagnetic touch detection circuit 501, the capacitance touch drive detection circuit 502, the switch unit 503 and the mode switching unit 504 may be integrated into a chip 500.

Practically, optionally another switch unit (not shown) may be provided between the ground line 403 and the ground end, the switch unit is turned off during the capacitive touch detection is performed (in this case the coil-shaped electrode 203 functioning as the virtual electrode is floated), and is turned on during the electromagnetic touch detection is performed.

Second Embodiment

Figure 4:
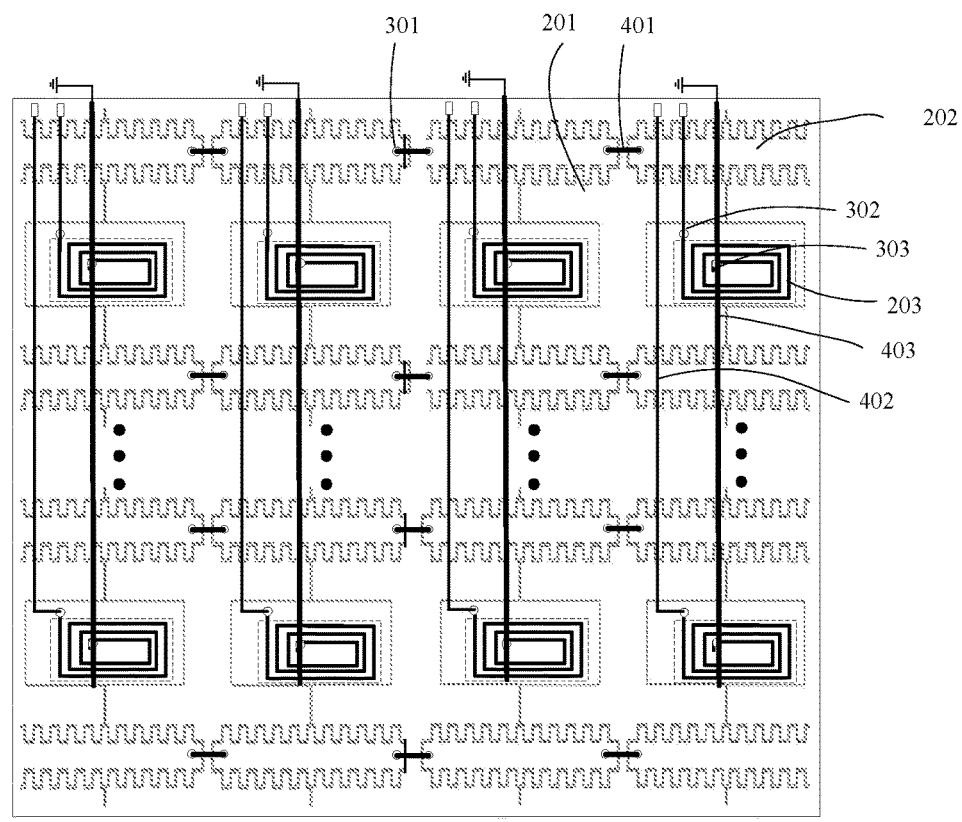
FIG. 4 is a top view of a structure of an electromagnetism and capacitance integrated touch screen according to a second embodiment of the disclosure.

In the first embodiment, the coil-shaped electrode 203 in the same row are electrically connected to the same detection line, thereby reducing the number of the detection lines and the number of terminals of the external drive detection circuit electrically connected to the detection line. Another electromagnetism and capacitance integrated touch screen is provided according to a second embodiment 4. For the second embodiment, the same part as the first embodiment is not further described, and only the different part from the first embodiment is further described hereinafter. FIG. 4 is a top view of a structure of the electromagnetism and capacitance integrated touch screen according to the second embodiment of the disclosure. As shown in FIG. 4, the second embodiment significantly differs from the first embodiment in that, each of the electromagnetism and capacitance integrated touch screen is electrically connected to each of the detection line. In this case, there are M*N coil-shaped electrodes 203, hence M*N detection lines 402 are electrically connected to the M*N corresponding coil-shaped electrodes 203, and M*N ports (PAD) are accordingly provided in the electromagnetic touch detection circuit. Also as shown in FIG. 4, all the coil-shaped electrodes 203 have the same number of turns and/or the same area, i.e., all the coils have the same number of turns, the same area or the same number of turns and the same area.

Third Embodiment

Figure 5:
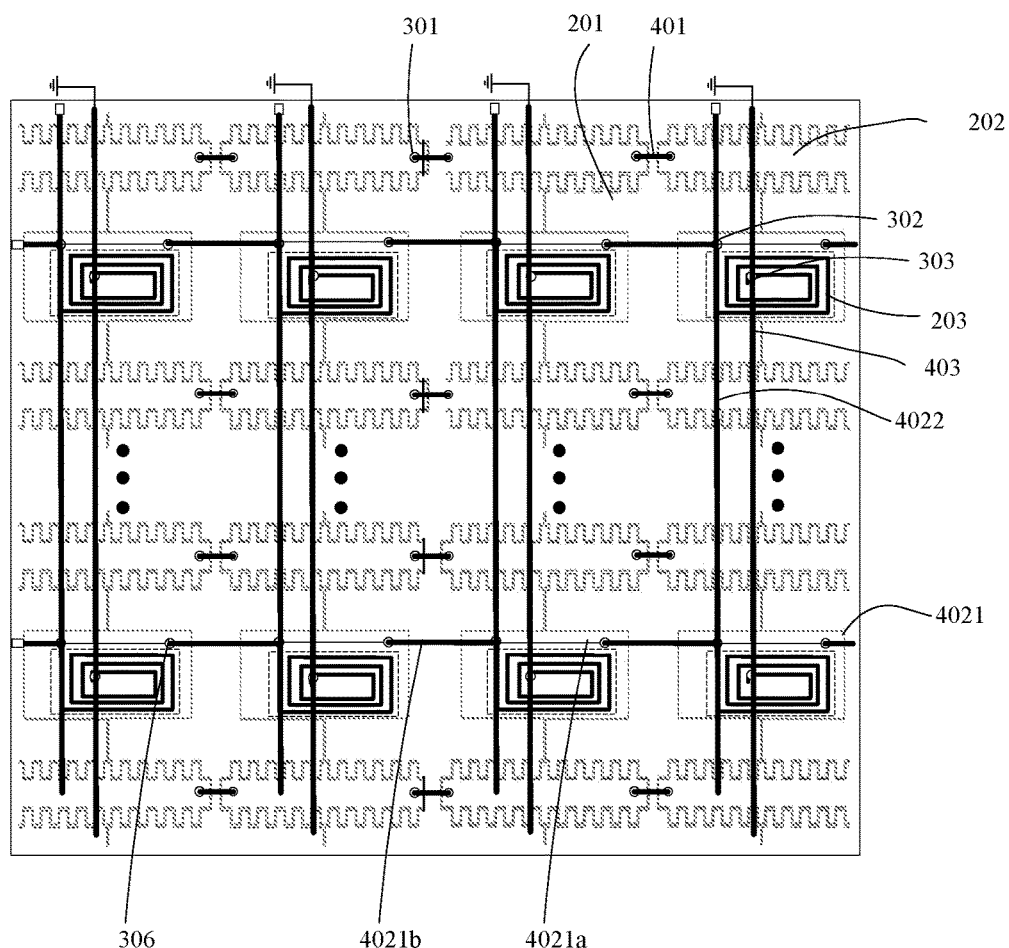
FIG. 5 is a top view of a structure of an electromagnetism and capacitance integrated touch screen according to a third embodiment of the disclosure.

In the first embodiment, the coil-shaped electrodes 203 in the same row are connected to the same detection line, thereby reducing the number of the detection lines and the number of terminals of the external drive detection circuit electrically connected to the detection line. Another electromagnetism and capacitance integrated touch screen is provided according to a third embodiment. For the third embodiment, the same part as the first embodiment is not further described, and only the different part from the first embodiment is further described hereinafter. FIG. 5 is a top view of a structure of the electromagnetism and capacitance integrated touch screen according to the third embodiment. As shown in FIG. 5, the third embodiment differs significantly from the first embodiment in that: the detection lines 402 include multiple row direction detection lines 4021 and multiple column direction detection lines 4022, where the column direction detection lines 4022 intersect and are electrically connected to the row direction detection lines 4021. It should be noted that, each row direction detection line 4021 in FIG. 5 includes a first row direction detection line segment 4021a located in the first electrode layer 200 and a second row direction detection line segment 4021b located in the second electrode layer 400. The first row direction detection line segment 4021a is electrically connected to the second row direction detection line segment 4021b through a via hole 306 through the insulation layer 300. The ground line 403 intersects the detection line 402 at the first row direction detection line segment 4021a, in this way the ground line 403 is electrically insulated from the detection line 402 by the insulation layer 300.

In an array of the coil-shaped electrodes 203 (M and N each are positive integers), each coil-shaped electrodes 203 is electrically connected to the row direction detection line 4021 and the column direction detection line 4022 intersecting the row direction detection line 4021. In this case, an induction signal which is generated by inducing an external electromagnetic signal by each coil 203 can be detected by an external detection circuit (not shown) through the row direction detection line 4021 and the column direction detection line 4022. The electromagnetic touch detection circuit 501 determines a column coordinate of a touch position of the electromagnetic pen based on the induction signal detected on the row direction detection line 4021, and determines a row coordinate of the touch position of the electromagnetic pen based on the induction signal detected on the column direction detection line 4022. In this case, there are M*N coil-shaped electrodes 203, hence accordingly (M+N) detection lines 402 are electrically connected to the M*N coil-shaped electrodes 203, and accordingly (M+N) ports (PAD) are provided in the electromagnetic touch detection circuit. Also as shown in FIG. 5, all the coil-shaped electrodes 203 have the same number of turns and/or the same area, i.e., all the coil-shaped electrodes 203 have the same number of turns, the same area or the same number of turns and the same area.

Fourth Embodiment

Figure 6:
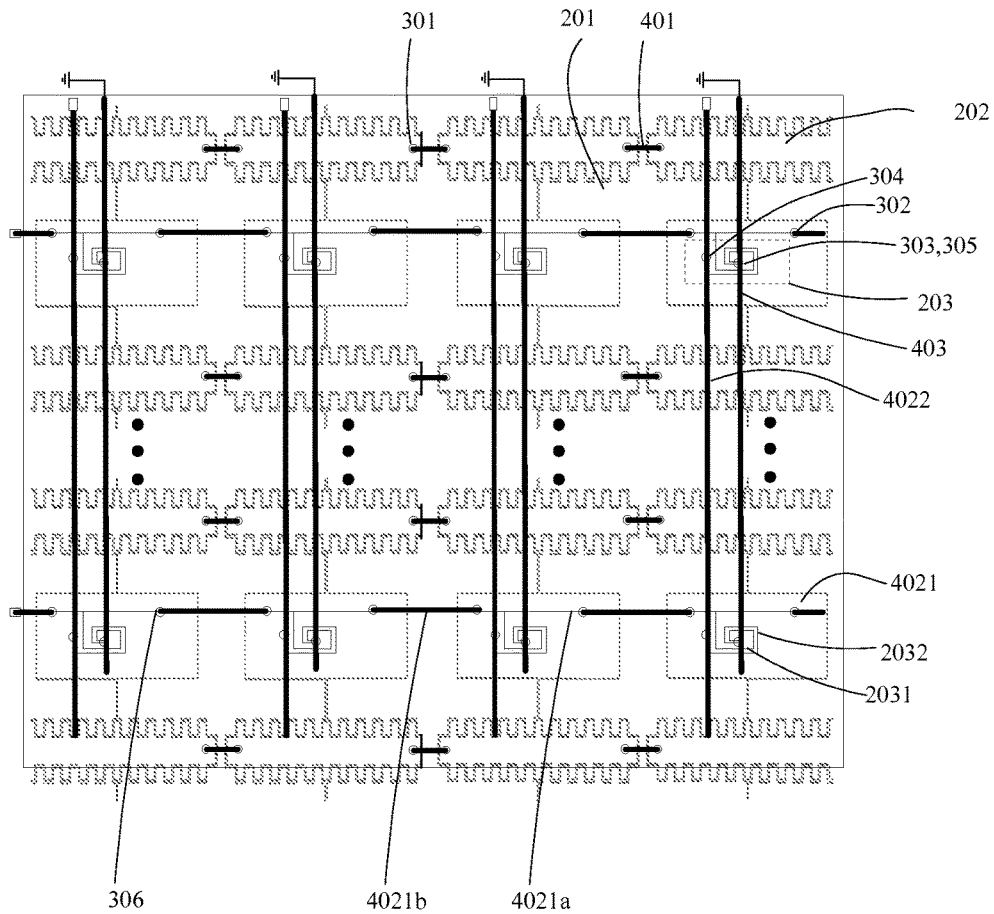
FIG. 6 is a top view of a structure of an electromagnetism and capacitance integrated touch screen according to a fourth embodiment of the disclosure.

In the first embodiment, the second embodiment and the third embodiment each, the coil-shape electrode 203 is a single coil. Another electromagnetism and capacitance integrated touch screen is provided according to a fourth embodiment. For the fourth embodiment, the same part as the first embodiment, the second embodiment and the third embodiment is further described, only the different part from the preceding embodiments is further described hereinafter. FIG. 6 is a top view of a structure of the electromagnetism and capacitance integrated touch screen according to the fourth embodiment. As shown in FIG. 6, the fourth embodiment significantly differs from the first embodiment, the second embodiment and the third embodiment in that: each coil-shaped electrodes 203 is a double coil (M and N each are positive integer), i.e., each coil includes a first sub-coil 2031 and a second sub-coil 2032 nesting with the first sub-coil 2031; multiple detection lines 402 include multiple row direction detection line 4021 and multiple column direction detection lime 4022, where the multiple column direction detection lines 4022 are insulated from and intersect the multiple row direction detection line 4021; and first sub-coils 2031 in the same row are electrically connected to one row direction detection line 4021, and second sub-coils 2032 in the same column are electrically connected to one column direction detection line 4022. In the array of coil-shaped electrodes 203, the first sub-coil 2031 and the second sub-coil 2032 of the each coil 203 are electrically connected to the row direction detection line 4021 and the column direction detection line 4022 intersecting the row direction detection line 4021 respectively. In this way, an induction signal which is generated by inducing an external electromagnetic signal by the first sub-coil 2031 of the each coil-shaped electrodes 203 can be detected by an external detection circuit (not show) through the row direction detection line 4021, and an induction signal which is generated by inducing the external electromagnetic signal by the second sub-coil 2032 of the each coil-shaped electrodes 203 can be detected by the external detection circuit through the column direction detection line 4022. The external detection circuit determines a column coordinate of a touch position of an electromagnetic pen based on the induction signal detected on the row direction detection line 4021, and determines the a row coordinate of the touch position of the electromagnetic pen based on the induction signal detected on the column direction detection lines 4022. In this case, there are M*N coil-shaped electrodes 203, hence accordingly (M+N) detection lines 402 are electrically connected to the M*N coil-shaped electrodes 203, and (M+N) ports (PAD) are accordingly provided in the electromagnetic touch detection circuit. In addition, the insulation layer 300 further includes multiple second via holes 302, third via holes 303, fourth via holes 304 and fifth via holes 305. Each first sub-coil 2031 includes a first terminal and a second terminal (not shown in Figure), and each second sub-coil 2032 includes a third terminal and a fourth terminal (not shown in Figure). The first terminal is electrically connected to the row direction detection line 4021 through the second via hole 302, the second terminal is electrically connected to the ground line 403 via the third via hole 303, the third terminal is electrically connected to the column direction detection line 4022 through the fourth via hole 304, and the fourth terminal is electrically connected to the ground line 403 through the fifth via hole. In FIG. 6, the third via hole 303 and the fifth via hole 305 share the same via hole. Each row direction detection line 4021 includes a first row direction detection line segment 4021a located in the first electrode layer 200 and a second row direction detection line segment 4021b located in the second electrode layer 400. The first row direction detection line segment 4021a is electrically connected to the second row direction detection line segment 4021b through a via hole 306 throughout the insulation layer 300. The ground line 403 and the column direction detection line 4022 each intersect the row direction detection line 4021 at the first row direction detection line segment 4021a, in this way the ground line 403 and the column direction detection line 4022 each are electrically insulated from the detection line 402 by the insulation layer 300.

In addition, also as shown in FIG. 6, all the first sub-coils 2031 have the same number of turns and/or all the second sub-coils 2032 have the same number of turns; or all the first sub-coils 2031 have the same area and/or all the second sub-coils 2032 have the same area; or the first sub-coil 2031 and the second sub-coil 202 have the same number of turns and/or the same area.

It should be noted that, in the first embodiment, the second embodiment, the third embodiment and the fourth embodiment, the first electrode 201 and the second electrode 202 are located in the same layer, however, those skilled in the art can know that the first electrode and the second electrode may be located at two sides of the insulation layer respectively, i.e., locating in different layers, based on the key concept of the disclosure.

Fifth Embodiment

Figure 7:
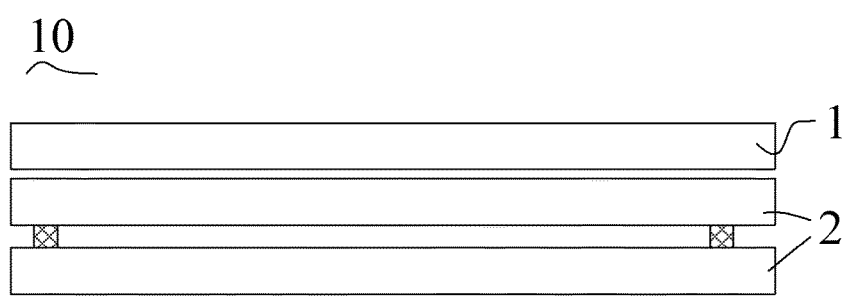
FIG. 7 is a schematic structural diagram of a touch display panel according to a fifth embodiment of the disclosure.

FIG. 7 shows a schematic structural diagram of a touch display panel according to a fifth embodiment of the disclosure. The touch display panel 10 includes the electromagnetism and capacitance integrated touch screen 1 described according to any the previously described embodiments. The touch display panel 10 may be a Liquid Crystal Display (LCD) panel, an Organic Light-Emitting Display (OLED) panel, a plasma display panel or an electronic paper or the like based on a display mode. Based on an integration relation between the touch structure and the display structure, the touch structure layer of the electromagnetism and capacitance integrated touch screen 1 may be located outside of the display panel 2 (as shown in FIG. 7), may be also located within the display panel, or may be also located on a surface of the display panel.

Sixth Embodiment

Figure 8:
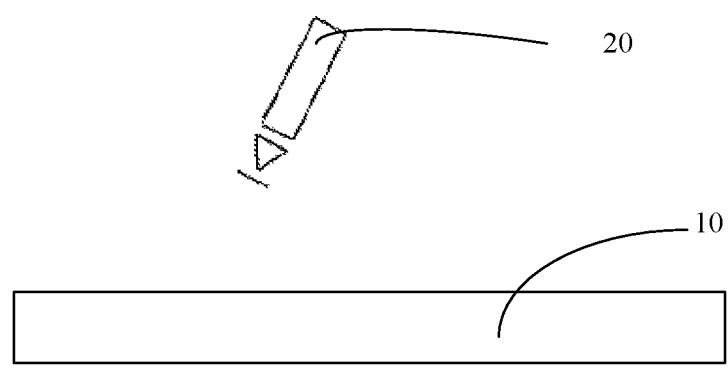
FIG. 8 is a schematic structural diagram of a touch display apparatus according to a sixth embodiment of the disclosure.

FIG. 8 shows a schematic structural diagram of a touch display apparatus according to a sixth embodiment of the disclosure. The touch display apparatus includes the touch display panel 10 described according to the fifth embodiment and an electromagnetic pen 20.

Apparently, those skilled in the art can make various changes and variations to the disclosure without departing from the spirit and scope of the disclosure. In this way, if theses changes and variations to the disclosure fall within the scope of the claims of the disclosure and the equivalent technologies thereof, the disclosure is intended to include these changes and variations.

The invention claimed is:

1. An electromagnetism and capacitance integrated touch screen, comprising:
   a plurality of capacitive touch electrodes, comprising a plurality of first electrodes extending along a first direction and a plurality of second electrodes extending along a second direction, wherein the plurality of second electrodes intersect and insulate from the plurality of first electrodes;
   a plurality of coil-shaped electrodes, each being arranged inside a region surrounded by two adjacent first electrodes and two adjacent second electrodes; and
   a plurality of detection lines;
   wherein the plurality of coil-shaped electrodes each functions as a virtual electrode when a capacitive touch detection is performed, and
   wherein the plurality of coil-shaped electrodes each is configured to detect an electromagnetic touch when an electromagnetic touch detection is performed;
   wherein the plurality of coil-shaped electrodes form an array; wherein the plurality of coil-shaped electrodes in the same row are electrically connected to a same detection line; wherein the coil-shaped electrodes in the same row have different numbers of turns or different areas; and wherein the coil-shaped electrodes in the same column have the same number of turns and/or the same area, or have different numbers of turns or different areas.

2. The electromagnetism and capacitance integrated touch screen according to claim 1, wherein the plurality of first electrodes, the plurality of second electrodes, and the plurality of coil-shaped electrodes are located in a first electrode layer;
   wherein the electromagnetism and capacitance integrated touch screen further comprises a second electrode layer and an insulation layer located between the first electrode layer and the second electrode layer.

3. The electromagnetism and capacitance integrated touch screen according to claim 2, wherein the plurality of detection lines are located in the second electrode layer.

4. The electromagnetism and capacitance integrated touch screen according to claim 3, wherein the second electrode layer further comprises a plurality of ground lines, the plurality of coil-shaped electrodes each comprises a first terminal and a second terminal, the first terminal is electrically connected to one of the plurality of detection lines, and the second terminal is electrically connected to one of the plurality of ground lines.

5. The electromagnetism and capacitance integrated touch screen according to claim 4, wherein the insulation layer further comprises a plurality of second via holes and a plurality of third via holes; wherein the first terminal is electrically connected to said detection line through a second via hole of the plurality of second via holes, and the second terminal is electrically connected to said ground line through a third via hole of the plurality of third via holes.

6. The electromagnetism and capacitance integrated touch screen according to claim 2, wherein each of the plurality of second electrodes is divided into a plurality of segments by the plurality of first electrodes, the second electrode layer comprises a plurality of bridge electrodes, and the plurality of segments in one of the second electrodes is electrically connected to each other through the plurality of bridge electrodes and the plurality of first via holes.

7. The electromagnetism and capacitance integrated touch screen according to claim 1, wherein the capacitive touch detection and the electromagnetic touch detection are performed in a time-division way; wherein the plurality of coil-shaped electrodes each is grounded or floated, when the capacitive touch detection is performed; and wherein the plurality of coil-shaped electrodes each generates an inductive signal by inducing an external electromagnetic signal, when the electromagnetic touch detection is performed.

8. A touch display panel, comprising an electromagnetism and capacitance integrated touch screen, wherein the electromagnetism and capacitance integrated touch screen comprises:
 a plurality of capacitive touch electrodes, comprising a plurality of first electrodes extending along a first direction and a plurality of second electrodes extending along a second direction, wherein the plurality of second electrodes intersect and insulate from the plurality of first electrodes;
 a plurality of coil-shaped electrodes, each being arranged inside a region surrounded by two adjacent first electrodes and two adjacent second electrodes; and
 a plurality of detection lines;
 wherein the plurality of coil-shaped electrodes each functions as a virtual electrode when a capacitive touch detection is performed; and wherein the plurality of coil-shaped electrodes each is configured to detect an electromagnetic touch when an electromagnetic touch detection is performed;
 wherein the plurality of coil-shaped electrodes form an array; wherein the plurality of coil-shaped electrodes in the same row are electrically connected to a same detection line; wherein the coil-shaped electrodes in the same row have different numbers of turns or different areas; and wherein the coil-shaped electrodes in the same column have the same number of turns and/or the same area, or have different numbers of turns or different areas.

9. A touch display apparatus, comprising a touch display panel, wherein the touch display panel comprises an electromagnetism and capacitance integrated touch screen;
 wherein the electromagnetism and capacitance integrated touch screen comprises:
 a plurality of capacitive touch electrodes, comprising a plurality of first electrodes extending along a first direction and a plurality of second electrodes extending along a second direction, wherein the plurality of second electrodes intersect and insulate from the plurality of first electrodes;
 a plurality of coil-shaped electrodes, each being arranged inside a region surrounded by two adjacent first electrodes and two adjacent second electrodes; and
 a plurality of detection lines;
 wherein the plurality of coil-shaped electrodes each functions as a virtual electrode when a capacitive touch detection is performed; and wherein the plurality of coil-shaped electrodes each is configured to detect an electromagnetic touch when an electromagnetic touch detection is performed;
 wherein the plurality of coil-shaped electrodes form an array; wherein the plurality of coil-shaped electrodes in the same row are electrically connected to a same detection line; wherein the coil-shaped electrodes in the same row have different numbers of turns or different areas; and wherein the coil-shaped electrodes in the same column have the same number of turns and/or the same area, or have different numbers of turns or different areas.

* * * * *